3,420,819
NOVEL SULFANILYLAMINOPYRIDAZINONE DERIVATIVES AND THEIR PRODUCTION
Takenari Nakagome, Nishinomiya, and Toshiaki Komatsu, Toyonaka, Japan, assignors to Sumitomo Chemical Co., Ltd., Osaka, Japan
No Drawing. Filed June 10, 1963, Ser. No. 286,448
Claims priority, application Japan, June 13, 1962, 37/24,792
U.S. Cl. 260—239.7     3 Claims
Int. Cl. C07d 51/04; A61l 23/00

This invention relates to novel sulfanilylaminopyridazinone derivatives and a process for preparing the same. More particularly this invention relates to 4-sulfanilylamino-3(2H)pyridazinone derivatives and a process for preparing the same.

It is one object of the present invention to provide novel sulfanilylaminopyridazinone derivatives which are extremely valuable as chemotherapeutic agent due to their high antibacterial activity. Another object of the present invention is to provide a novel process for preparing the sulfanilylaminopyridazinones.

The novel sulfanilylaminopyridazinones of the present invention are represented by the general formula:

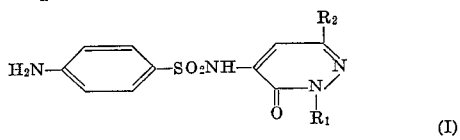

wherein $R_1$ is a lower alkyl radical and $R_2$ is a hydrogen atom or a lower alkyl radical.

These compounds can be obtained, according to this invention, by the reaction of a 4-amino-3(2H)pyridazinone derivative of the general formula:

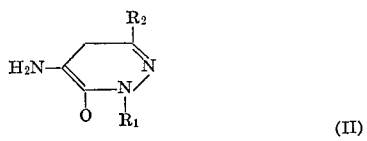

in which $R_1$ may be a lower alkyl radical and $R_2$ may be a hydrogen atom or a lower alkyl radical, with a p-acylaminobenzenesulfonyl halide to form 4-(p-acylaminobenzenesulfonylamino)-3(2H)pyridazinone derivative of the general formula:

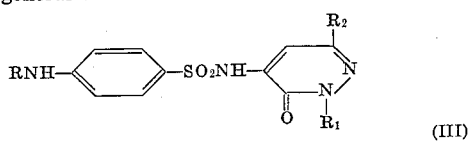

in which R may be an acyl radical, $R_1$ may be a lower alkyl radical and $R_2$ may be a hydrogen atom or a lower alkyl radical, followed by hydrolysis.

4-amino-3(2H)pyridazinone derivatives of the above-indicated general Formula II, which are used for the preparation of the compounds of the present invention, can readily be prepared by the action of dimethylsulfate on 4-substituted-3(2H)pyridazinone derivatives (4-substituent may be any radical capable of being converted to an amino group), followed by conversion of 4-substituent in the resulting 2-lower alkyl-4-substituted-3(2H)pyridazinone into 4-amino group, or by the amination of 2-lower alkyl-4,5-dihalo-3(2H)pyridazinone derivatives followed by the dehalogenation of the resulting monoamino compounds.

While these 4-amino-3(2H)pyridazinone derivatives can be advantageously obtained by the above mentioned processes, they may be prepared by any of other processes.

In accordance with the process of the present invention, the first step in producing the compounds of the present invention usually involves the reaction of a 4-amino-3(2H)pyridazinone derivative with a p-acylaminobenzenesulfonyl halide. Reaction conditions to be employed are substantially similar to those which are conventionally employed for the preparation of known sulfanilylamide compounds, e.g. sulfanilylaminodiazine, sulfanilylaminoisoxazole. In the most preferred embodiment, both of the above-indicated reactants in approximately equimolar ratio are reacted at a temperature of from room temperature, e.g. 15° C. to 100° C., more preferably from 25° C. to 60° C., in the presence or absence of a solvent. The reaction which takes place herein is shown by the following equation:

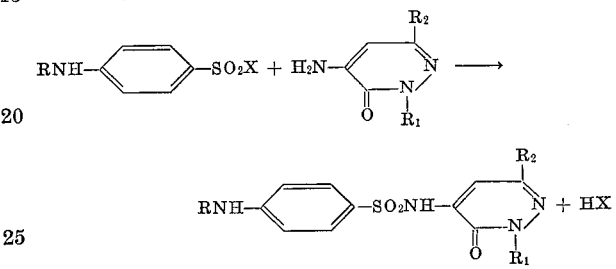

wherein $R_1$ stands for a lower alkyl radical and $R_2$ stands for a hydrogen atom or a lower alkyl radical, X is a halogen atom and R stands for an acyl radical. As apparent from the equation, hydrogen halide is by-produced during the reaction, and therefore, it is particularly recommended to carry out the reaction in the presence of a hydrogen halide-acceptor, such as pyridine, alkali carbonate, alkali bicarbonate, etc. Suitable solvents, if used for the instant reaction, include water, methanol, ethanol, propanol, etc. Pyridine is particularly suitable because it takes a part as solvent and hydrogen halide-acceptor. Thus formed 4-(p-acylaminobenzenesulfonylamino)-3(2H)pyridazinone derivative of the general Formula III is then subjected to hydrolysis. Thus, for example, it is heated together with an aqueous or alcoholic solution of a dilute acid or a dilute alkali solution (e.g. 1% to 40% solution) for a short time (e.g. from 10 minutes to 5 hours), thereby to give the corresponding 4-sulfanilylamino-3(2H)pyridazinone of the general Formula I as the hydrolysis product. The hydrolysis reaction can be advantageously carried out at a temperature of from 90° C. to 100° C. for a period of from 0.5 to 1.5 hours.

The acyl radical which is attached to protect the p-amino portion of the said acylaminobenzenesulfonyl halide may be fomyl, acetyl, propionyl, butyryl, ethoxycarbonyl, benzoyl, etc. The halogen atom which constitutes the sulfonyl halide portion may be chlorine or bromine.

In the general Formulae I, II and III, $R_1$ and $R_2$ may be taken as a hydrogen or lower alkyl radical, such as methyl, ethyl, n-propyl, isopropyl, butyl (including isomeric structures), etc. Particularly preferable as the $R_1$ and $R_2$ is methyl radical.

Thus obtained 4-sulfanylylamino-3(2H)pyridazinone derivatives are novel compounds; for instance, 4-sulfanilylamino-2,6-dimethyl-3(2H)pyridazinone is a colorless crystalline substance melting at 200° C., and it is easily soluble in dilute mineral acid and in alkali bicarbonate solutions and difficultly soluble in benzene, chloroform and ethyl ether. It is easily soluble in hot alcohol and recrystallizable from alcohol or water.

The sulfanilylaminopyridazinone compounds of the present invention are less toxic and valuable as chemotherapeutic agent, being effective against a variety of pathogenic microorganisms. When these compounds are orally administered, the maximum blood concentration is reached within a shorter time, duration of its blood concentration is comparatively longer, and the inactivation in blood is low.

Thus, the present compound shows in vivo antibacterial activity stronger than the heretofore known long-acting sulfa drugs.

Table 1 shows the comparative data of the in vitro bacteriostatic activity of the present compound and the heretofore known sulfa drugs.

TABLE 1

| Strains tested | Minimum growth inhibitory concentration ($\mu$g./cc.) | | | |
|---|---|---|---|---|
| | Compound of the invention (Example 1) | SI | SDM | SMP |
| Staphylococcus aureus 209p | 12.5 | 6.25 | 6.25 | 12.5 |
| Esherichia coli O111 | 25 | 200 | 50 | 200 |
| Salmonella typhi 58 | 50 | 50 | 50 | 25 |
| Salmonella paratyphi 1015 | 3.13 | 3.13 | 1.56 | 1.56 |
| Salmonella schottmuelleri 8006 | 25 | 6.25 | 6.25 | 12.5 |
| Shigella flexneri 2a | 6.25 | 6.25 | 3.13 | 3.13 |
| Klebsiella pneumoniae PCI 602 | 100 | 200 | 100 | 100 |
| Proteus vulgaris K-S | 0.39 | 0.39 | 0.78 | 0.39 |
| Streptococcus group A type I | 25 | 25 | 25 | 25 |
| Diplococcus pneumoniae type I | 6.25 | 6.25 | 6.25 | 6.25 |
| BCG | 50 | 100 | 100 | 200 |

Tables 2 and 3 show the comparative data of curative effectiveness against Streptococcus and Diplococcus infections in mice by the oral administration of the compound of the present invention, as well as the heretofore known sulfa drugs. The strains used are Streptococcus group A type I and *Diplococcus pneumoniae* type I. The treatment is once daily for five consecutive days.

TABLE 2.—STREPTOCOCCUS GROUP A TYPE I

| | Mg./kg./day | Survivors/ numbers of tested animals | Survival percent after 14 days |
|---|---|---|---|
| Control | 0 | 0/50 | 0 |
| Compound of the invention (Ex. 1) | 1 | 0/10 | 0 |
| | 5 | 5/5 | 100 |
| | 10 | 10/10 | 100 |
| SDM | 1 | 4/30 | 13.3 |
| | 5 | 12/50 | 24 |
| | 10 | 13/50 | 26 |
| SMP | 1 | 3/30 | 10 |
| | 5 | 17/50 | 34 |
| | 10 | 28/40 | 70 |
| SP | 5 | 1/20 | 5 |
| | 10 | 4/20 | 20 |
| SIM | 25 | 6/30 | 20 |
| | 100 | 4/10 | 40 |
| SI | 50 | 3/10 | 30 |
| | 100 | 19/40 | 47.5 |

TABLE 3.—*DIPLOCOCCUS PNEUMONIAE* TYPE I

| | Mg./kg./day | Survivors/ numbers of tested animals | Survival percent after 14 days |
|---|---|---|---|
| Control | 0 | 0/50 | 0 |
| Compound of the invention (Ex. 1) | 100 | 0/10 | 0 |
| | 500 | 10/10 | 100 |
| SDM | 100 | 0/10 | 0 |
| | 500 | 9/30 | 30 |
| SMP | 100 | 1/10 | 10 |
| | 500 | 5/20 | 25 |
| SP | 250 | 0/10 | 0 |
| | 500 | 0/10 | 0 |
| SIM | 100 | 1/10 | 10 |
| | 500 | 3/30 | 10 |
| SI | 250 | 0/10 | 0 |
| | 500 | 1/10 | 10 |

Table 4 shows the acute toxicity in the oral administration of the compound of the present invention, as well as the heretofore known sulfa drugs. In Table 4 $LD_{50}$ mean 50% lethal dose (g./kg).

TABLE 4

| Samples tested: | $LD_{50}$ (g./kg.) |
|---|---|
| Compound of the present invention Example 1) | 1.07 |
| SMP | 1.75 |
| SIM | 2.65 |
| SI | 6.80 |
| SDM | 10 |

In the above-indicated tables, the abbreviation of the samples are as follows:

SI: Sulfisoxazole—3,4-dimethyl-5-sulfanilamido-isoxazole
SDM—Sulfadimethoxine—2,6-dimethoxy-4-sulfanilamidopyrimidine
SMP: Sulfamethoxypyridazine—3-methoxy-6-sulfanilamidopyridazinone
SP: Sulfaphenazole—1-phenyl-5-sulfanilamidopyrazole
SIM: Sulfisomezole—5-methyl-3-sulfanilamidoisoxazole In order that those skilled in the art may better understand the invention, the following examples are given which are illustrative of the invention and are not intended for purposes of limitation.

Example 1.—2,6-dimethyl-4-sulfanilylamino-3(2H)pyridazinone 2,6-dimethyl-4-amino-3(2H)pyridazinone (3.3 grams) are suspended in 40 cc. of dry pyridine and 6.2 grams (1.1 times the stoichiometric amount) of p-acetylaminobenzenesulfonyl chloride are added portionwise in the cold, with stirring. After completion of the addition, the resulting solution is allowed to stand at room temperature overnight. The reaction mixture is poured into ice water, 13 cc. of 2 N caustic soda solution are added, and the solution is concentrated under reduced pressure. To the resulting residue, 100 cc. of 2 N caustic soda solution are added, and the resulting mixture is boiled under reflux for one hour. After cooling, it is added with charcoal and then filtered. The filtrate is neutralized with dilute hydrochloric acid to form precipitate which is collected by filtration and washed with water. It has M.P. 200–201° C. Yield, 4.3 grams (62%). Recrystallization from methanol affords colorless scales, M.P. 200–201° C. Elementary analysis for $C_{12}H_{14}O_3N_4S$ is as follows:

Calc.: C, 48.98%; H, 4.80%; N, 19.04%. Found: C, 49.32%; H, 5.07%; N, 19.16%.

Example 2.—2-methyl-4-sulfanilylamino-3(2H)pyridazinone 2-methyl-4-amino-3(2H)pyridazinone (2.5 grams) are suspended in 30 cc. of dry pyridine and 5.2 grams of p-acetylaminobenzenesulfonyl chloride are added portionwise in the cold, with stirring. The reaction mixture is allowed to stand at room temperature overnight, poured into ice water, and then 20 cc. of N caustic soda solution are added. The pyridine is distilled off under reduced pressure and the deposited pale yellow crystals are collected. Yield, 5.4 grams. M.P. 281° C. The crystals thus obtained are dissolved in 40 cc. of 10% caustic soda solution and the solution is boiled under reflux for three quarters of an hour. After cooling, on neutralization with acetic acid the white solid separates out, which is filtered, washed with water, and dried, yielding 4.6 grams of 2-methyl-4-sulfanilylamino-3(2H)pyridazinone, M.P. 246–248° C. It is recrystallized from methanol giving 4.2 grams of colorless needles, M.P. 230–231° C. Elementary analysis for $C_{11}H_{12}O_3N_4S$ is as follows:

Calc.: C, 47.14%; H, 4.32%; N, 20.89%. Found: C, 47.36%; H, 4.39%; N, 20.21%.

What we claim is:

1. A 4-sulfanilylamino-3(2H)pyridazinone derivative of the formula:

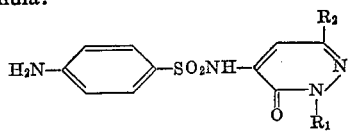

wherein $R_1$ is a lower alkyl radical and $R_2$ is a member selected from the group consisting of hydrogen atom and lower alkyl radicals.

2. 2,6-dimethyl-4-sulfanilylamino-3(2H)pyridazinone.
3. 2-methyl-4-sulfanilylamino-3(2H)pyridazinone.

References Cited
FOREIGN PATENTS 600,532  4/1948  Great Britain.
579,391  2/1932  Germany.

OTHER REFERENCES

Homer et al.: J. Chem. Soc. 1948, pp. 2195–2201.
Nakagome et al.: Yakugaku Zasshi, vol. 82, pp. 1103–1109 (1962).
Homer et al.: J. Chem. Soc., 1948, pp. 2191–2194 added.
Beilstein's Handbuchder Organischen Chemie, vol. 24, 4th ed., Erganzungswerk (System No. 3561), p. 189, Ver lag Springer, Berlin, Germany (1936).

JOHN D. RANDOLPH, *Primary Examiner.*

U.S. Cl. X.R.

260—250; 424—229